Dec. 19, 1967  B. R. FOW ET AL  3,359,557
CLEAR AIR TURBULENCE ADVANCE WARNING AND EVASIVE
COURSE INDICATOR USING RADIOMETER
Filed Feb. 14, 1966  3 Sheets-Sheet 1

INVENTORS
BENJAMIN R. FOW
RICHARD F. HAZEL
WAYNE D. MOUNT
BY Robert J. Haase
ATTORNEY

INVENTORS
BENJAMIN R. FOW
RICHARD F. HAZEL
WAYNE D. MOUNT
BY
ATTORNEY

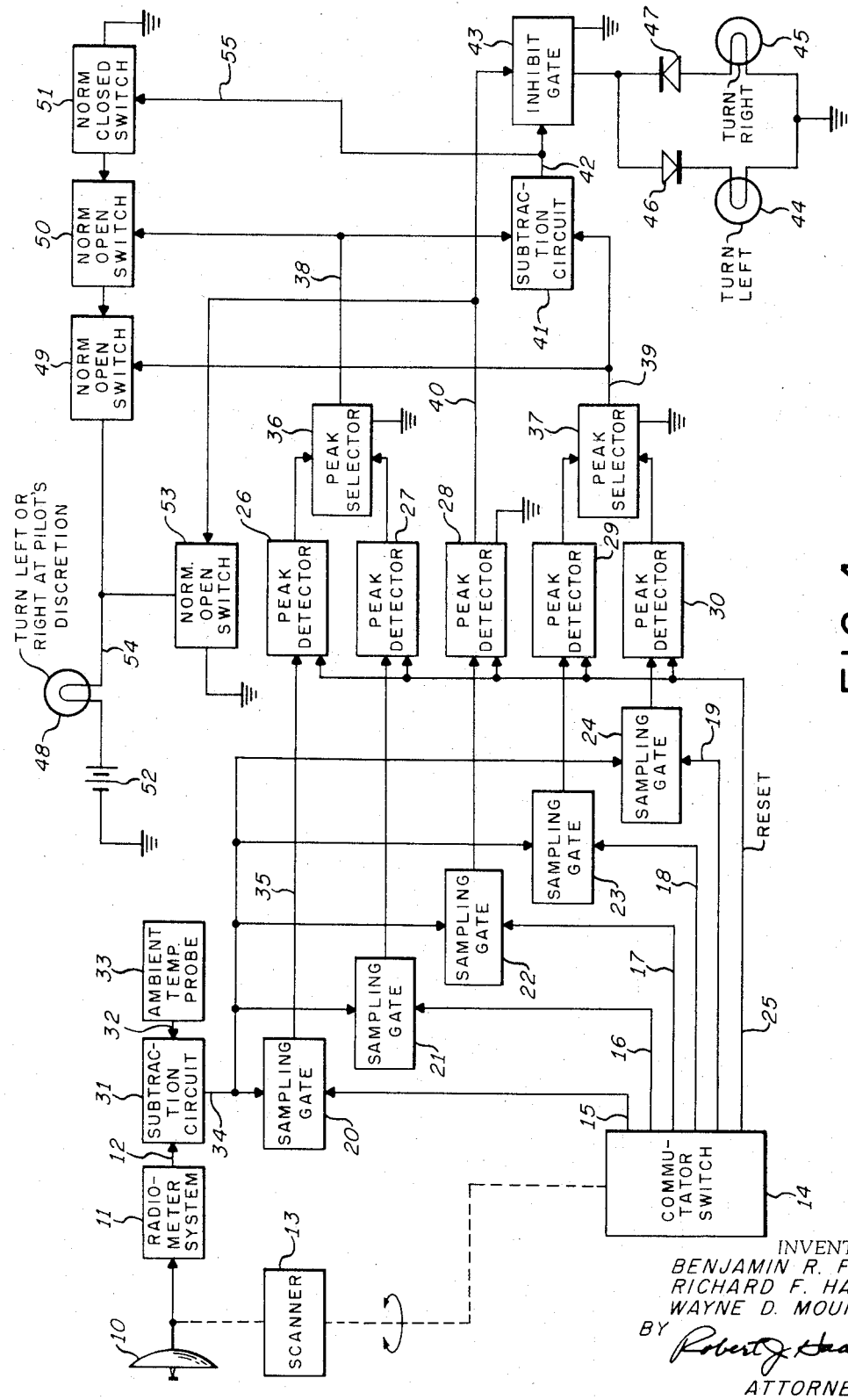

United States Patent Office 3,359,557
Patented Dec. 19, 1967

3,359,557
CLEAR AIR TURBULENCE ADVANCE WARNING AND EVASIVE COURSE INDICATOR USING RADIOMETER
Benjamin R. Fow, Waltham, Richard F. Hazel, Marlboro, and Wayne D. Mount, South Lincoln, Mass., assignors to Sperry Rand Corporation, a corporation of Delaware
Filed Feb. 14, 1966, Ser. No. 527,219
7 Claims. (Cl. 343—100)

ABSTRACT OF THE DISCLOSURE

Clear air turbulence avoidance means including a radiometer (distant) temperature sensor and ambient (local) temperature sensor interconnected to produce an output signal representing the difference between said temperatures. The radiometer is equipped for scanning to find the direction of maximum output signal amplitude. The maximum output signal is amplitude compared with a reference signal to provide a warning signal and evasive course signal when the maximum output signal amplitude exceeds the reference signal amplitude.

---

The present invention generally relates to systems for the detection of clear air turbulence and, more particularly, concerns a system for producing advance warning of such turbulence and an indication of a course for avoiding it.

Clear air turbulence (CAT) can be generated by atmospheric processes which are markedly different from each other in terms of their physical and dynamical characteristics. Atmospheric processes giving rise to CAT include mountain waves, vertical convection currents and jet stream frontal regions. CAT associated with mountain waves is predictable from data obtained and disseminated by the existing network of weather stations. CAT due to strong vertical convection currents is usually found in the proximity of large cumulus type clouds which are detectable using existing weather radars. CAT which occurs in jet stream frontal regions, however, is not detectable at the present state of the art with advance warning sufficient to enable a pilot to execute an evasive course.

One object of the present invention is to provide means producing an advance warning of clear air turbulence associated with jet stream frontal regions.

Another object is to provide means for indicating an evasive course for avoiding clear air turbulence associated with jet stream frontal regions.

An additional object is to provide an advance warning and evasive course indicator for oncoming clear air turbulence associated with jet stream frontal regions.

These and other objects of the present invention, as will appear from a reading of the following specification, are accomplished in the disclosed embodiment by the provision of means including a radiometer system for determining the weighted mean temperature value of a known volume of air into which the protected aircraft is heading. The radiometer data, representing remote air temperature, is compared with the ambient temperature measured at the location of the protected aircraft. The difference between the remote and the ambient air temperatures is compared to a reference value representing a temperature gradient above which clear air turbulence is likely to occur. Any excess in the value of said difference over the value of said reference provides an advance warning of clear air turbulence.

Provision is also made in the present invention for making a plurality of radiometer measurements and corresponding clear air turbulence determinations along a plurality of directions on either side of the protected aircraft flight path as well as along the flight path itself. The radiometer direction yielding the maximum temperature gradient in excess of the aforementioned reference value is determined and an evasive course indication is given to direct the pilot away from the oncoming clear air turbulence associated with said maximum gradient.

For a more complete understanding of the present invention, reference should be had to the following specification and to the appended figures of which:

FIGURE 4 is a simplified block diagram of apparatus carried by the protected aircraft for producing the advance warning and evasive course indication of the present invention.

The present invention exploits the fact that jet stream frontal CAT is caused by strong wind shears in the frontal regions. The intensity of the wind shear, in turn, is proportional to the magnitude of the horizontal temperature gradient within the front. Thus, by determining said horizontal temperature gradient, a measure is obtained of the likelihood of CAT.

Figure 1:
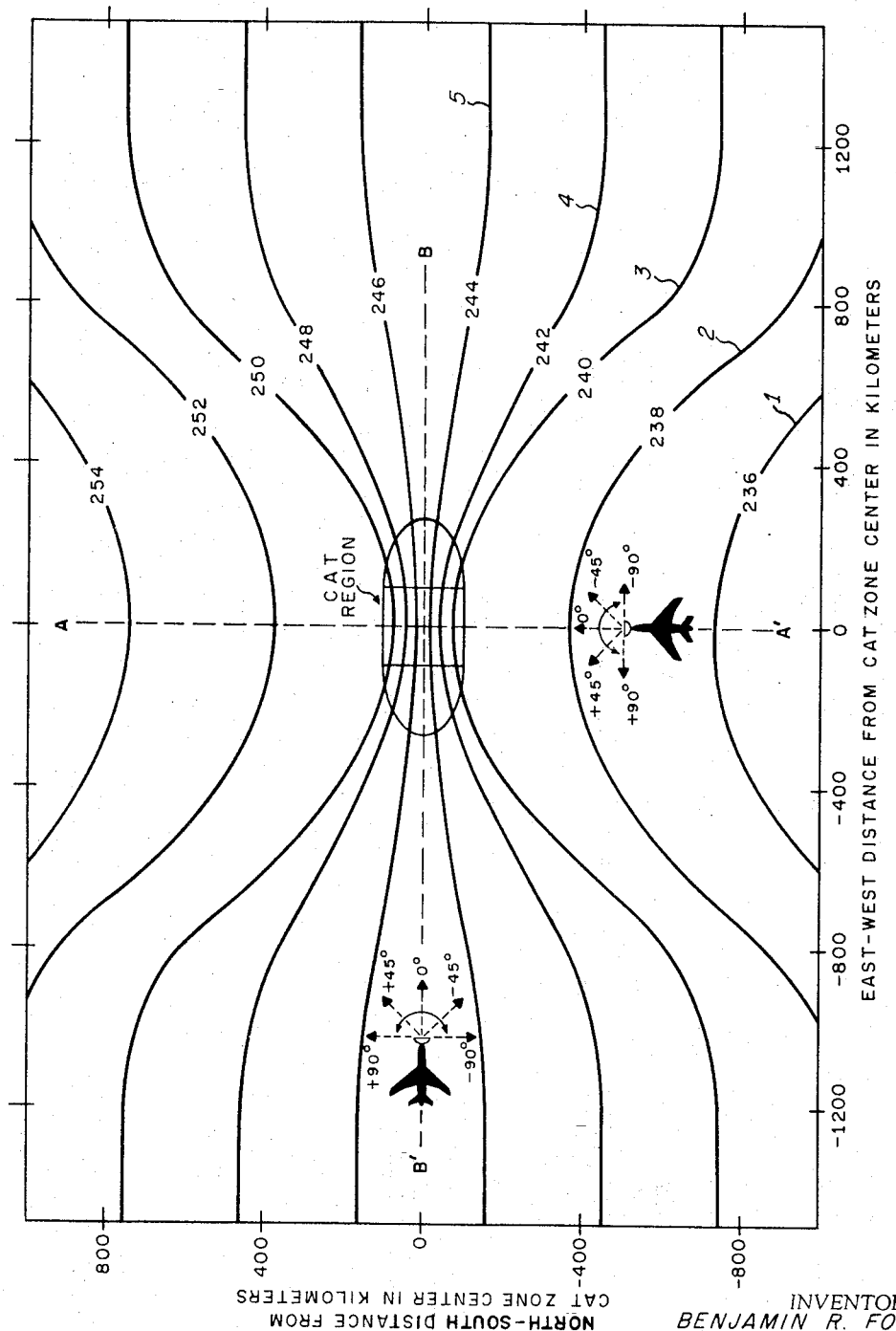
FIGURE 1 is a plot of a horizontal section of the atmosphere depicting a model of the thermal structure in and surrounding region of jet stream frontal clear air turbulence.

Referring to FIGURE 1, it can be seen that the isotherms typified by isotherms 1, 2, 3, 4 and 5, converge at the center of the plot to form a strong horizontal temperature gradient, i.e., a region of jet stream frontal CAT. At distances removed from the CAT region, the isotherms delineate a uniform thermal structure which corresponds to normal atmospheric conditions. Each of the isotherms is further identified in the plot by the temperature value in degrees Kelvin which it represents. A protected aircraft approaching the CAT region along the flight path A'–A having only an ambient temperature sensor (for determining air temperature at the location of the aircraft) would measure more rapid changes in temperature upon entering the CAT region than it had measured prior thereto. It should be understood that the CAT region designated in FIGURE 1 is not necessarily a region in which CAT is uniformly distributed; it is, instead, a region in which there is a high probability of existence of CAT cells. Although it is possible that an aircraft measuring ambient temperature only would detect the strong thermal gradient before actually encountering a CAT cell, it is quite likely that the strong thermal gradient would be discovered simultaneously with, or even after, the aircraft has been subjected to CAT. It is clear, therefore, that the ambient temperature measuring system (which determines only the temperature at the location of the aircraft) has restricted usefulness. It provides a warning of CAT only in the limited sense that the pilot is told that he is already in a region where he is likely to encounter CAT.

Another serious shortcoming of the ambient temperature measuring system is its inability to reveal the presence of horizontal temperature gradients associated with CAT when the aircraft is approaching the CAT zone along an isotherm such as the line B'–B of FIGURE 1. In such an event, the ambient temperature remains constant and can provide no basis for determining the presence of oncoming CAT.

The present invention not only overcomes both of the above-mentioned disadvantages of the ambient temperature measuring system, but provides in addition an indication to the pilot of an evasive course for avoiding CAT. These desirable results are predicated in part upon a radiometer determination of remote air temperature values in a plurality of directions from the protected aircraft. The depth of penetration, i.e., the distance at which each radiometer temperature measurement applies, is a known function of the altitude of the aircraft and the frequency at which the radiometer measurement is made. The relationships are discussed in copending patent application Ser. No. 519,354, filed in Jan. 7, 1966, for "Millimeter Wave Radiometer System for Measuring Air Temperature" in the names of the present inventors and assigned to the present assignee.

Briefly, said patent application discloses a tunable radiometer system responsive to signals received in the millimeter frequency band which naturally emanate from oxygen molecules within the atmospheric volume under examination. The oxygen molecules are substantially uniformly distributed in the atmosphere and radiate signals at power levels proportional to their temperature. The weighted mean value of the temperature contributions of all of the radiating oxygen molecules is determined within a conical volume of air of substantially fixed apex angle but variable length as measured from the location of the radiometer. The length of the air volume is controlled in accordance with the frequency to which the radiometer is tuned on the basis that the distance through the atmosphere that the radiation from oxygen molecules can travel is a known function of the absorption coefficient. Said coefficient, in turn, is a known function of the frequency of the radiation and the altitude of the oxygen molecules whose radiative power is being measured. By tuning the radiometer to selectable frequencies throughout the band in which radiation from distant oxygen molecules is absorbed and reradiated by intervening molecules and by measuring the power level of the received radiation at the different frequencies, the weighted mean air temperature values are determined for different depths (as measured from the radiometer location).

Figure 2:
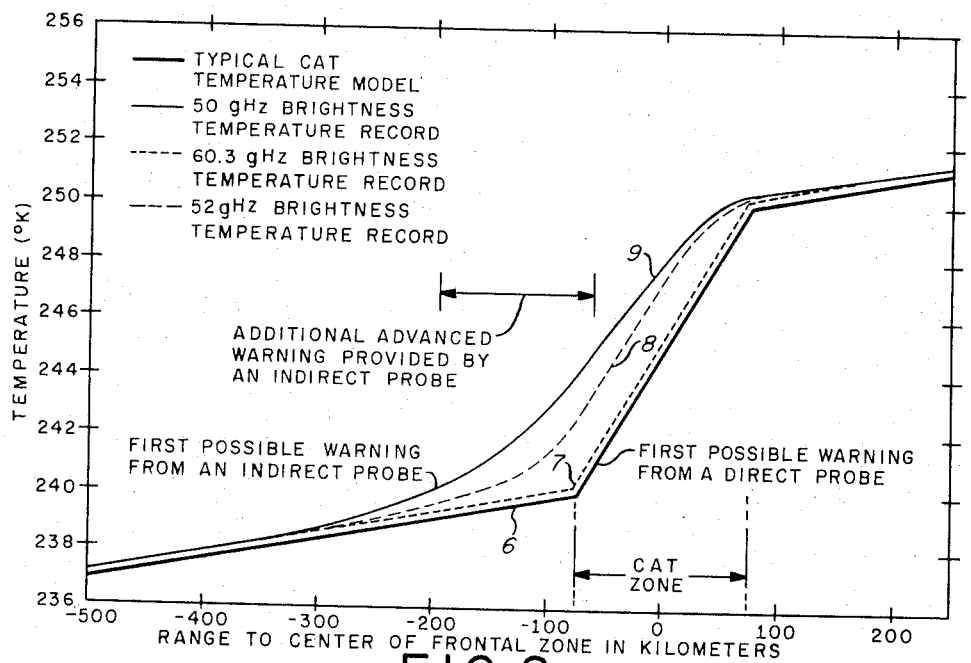
FIGURE 2 is a plot of typical radiometric and ambient temperature readings recorded by an aircraft flown from A' to A in the plot of FIGURE 1.

The principles underlying the present invention can be understood by considering the typical example of a protected aircraft, having a forward-looking radiometer and a probe for measuring ambient temperature, approaching the CAT zone depicted in FIGURE 1 along the flight path from A' to A. The ambient (local) temperature measurements and the radiometer (remote) temperature measurements that would be made at the three radiometer operating frequencies of 50 gigacycles per second (gHz.), 52 gHz., and 60.3 gHz. are depicted in FIGURE 2. The temperature readings are those which would be made at the designated frequencies assuming that the aircraft was flying at an altitude of 8 kilometers.

It will be observed from FIGURE 2 that the ambient temperature readings of curve 6 (direct probe) give no significant advance warning of CAT; the same is essentially true when the radiometer measurements of line 7 (indirect probe) are made at the operating frequency of 60.3 gHz. It can be seen, however, that the radiometer measurements of lines 8 and 9 respectively made at 52 gHz. and at 50 gHz. depart significantly from the direct probe readings. In particular, the magnitude and, to a lesser extent, the rate of change of the difference between the indirect radiometric and the direct ambient probe temperatures under go significant change when the aircraft is still about 200 kilometers away from the CAT zone. Thus, an advance warning of a protected aircraft's approach toward a CAT region may be based upon a determination of the difference between the radiometric temperature measured at a known frequency and altitude and the ambient temperature and determining whether said difference exceeds a reference value above which clear air turbulence is likely to be encountered. This is the principle upon which the present invention is based.

The absence of a temperature difference between a forward looking radiometer and an ambient temperature probe does not preclude the possibility that CAT does exist ahead of the vehicle. This can be seen by referring to FIGURE 1 and assuming that the aircraft is approaching the CAT region along an isotherm such as the flight path from B' to B. In this assumed case, there is no difference between radiometric temperature measurement corresponding to the forward direction and the ambient temperature measurement. However, a significant difference between the two temperature measurements can be monitored if the direction of the radiometer measurement is changed relative to the aircraft flight path. More particularly, if radiometer measurements are made along five directions (along the flight path, ±45° relative to the flight path and ±90° relative to the flight path), the measurements depicted in FIGURE 3 would be made. In the general case of any arbitrary flight path relative to the thermal structure surrounding a region of jet stream frontal CAT, an advance warning can be obtained through the expedient of making temperature determinations along a known plurality of directions relative to the flight path. A reliable advance warning of impending CAT is generated in every case even when the aircraft is proceeding along an isotherm. The directions of the oncoming CAT relative to the aircraft flight path is determined by noting the direction of the maximum temperature gradient relative to said flight path. An evasive maneuver then is made in a direction away from the maximum temperature gradient.

Apparatus for determining the above-discussed temperature gradients in known directions and for producing an evasive course indication is represented in the simplified block diagram of FIGURE 4. Signals received from radiating oxygen molecules are received by directional antenna 10 and applied to radiometer system 11. Radiometer system 11, as more fully described in the aforementioned copending patent application, provides an output signal on line 12 representing the weighted mean value of the temperature contributions of all the radiating oxygen molecules within a conical volume of air. Said volume is of a substantially fixed apex angle determined by the beam width of directional antenna 10 and of a variable length determined by the frequency of operation and the altitude of radiometer system 11. Antenna 10 is scanned in azimuth by scanner 13 which also drives commutator switch 14. Switch 14 provides gating signals in succession on lines 15, 16, 17, 18 and 19 for successively operating sampling gates 20, 21, 22, 23 and 24, respectively. Each of the gating signals is generated when scanner 13 has driven antenna 10 to a respective azimuth. For example, in a representative case, the gating signals on lines 15, 16, 17, 18 and 19 are generated when antenna 10 faces —90°, —45°, 0°, +45°, and +90°, respectively, relative to the heading of the aircraft carrying the apparatus of FIGURE 4. In addition to the gating signals, commutator switch 14 also provides on output line 25 a signal for resetting each of the peak detectors 26, 27, 28, 29 and 30 which receive output signals from gates 20, 21, 22, 23 and 24, respectively. The reset pulses on line 25 are conveniently generated during the time that antenna 10 is being driven from +90° to —90° relative to the aircraft heading in preparation for the start of a new scanning cycle.

The signal on line 12, representing the weighted mean temperature value of the volume of air under surveillance, is compared in subtraction circuit 31 with a signal on line 32 (provided by ambient temperature probe 33) representing the air temperature at the location of the aircraft. A signal representing the difference in value between the signals on lines 12 and 32 is produced on line 34 for joint application to sampling gates 20, 21, 22, 23 and 24.

Sampling gate 20, for example, is rendered conductive each time that a gating pulse appears on line 15, i.e., each time that directional antenna 10 is facing −90° relative to the aircraft heading. The amplitude of the difference signal on line 34 is sampled by gate 20 and applied via line 35 to peak detector 26. Peak detector 26 stores the amplitude of the difference signal on line 34 at the time when antenna 10 faces −90° relative to the aircraft heading. Similarly, peak detectors 27, 28, 29 and 30 store the amplitude of the difference signal on line 34 when antenna 10 faces the directions of −45°, 0°, +45°, and +90°, respectively.

Figure 3:
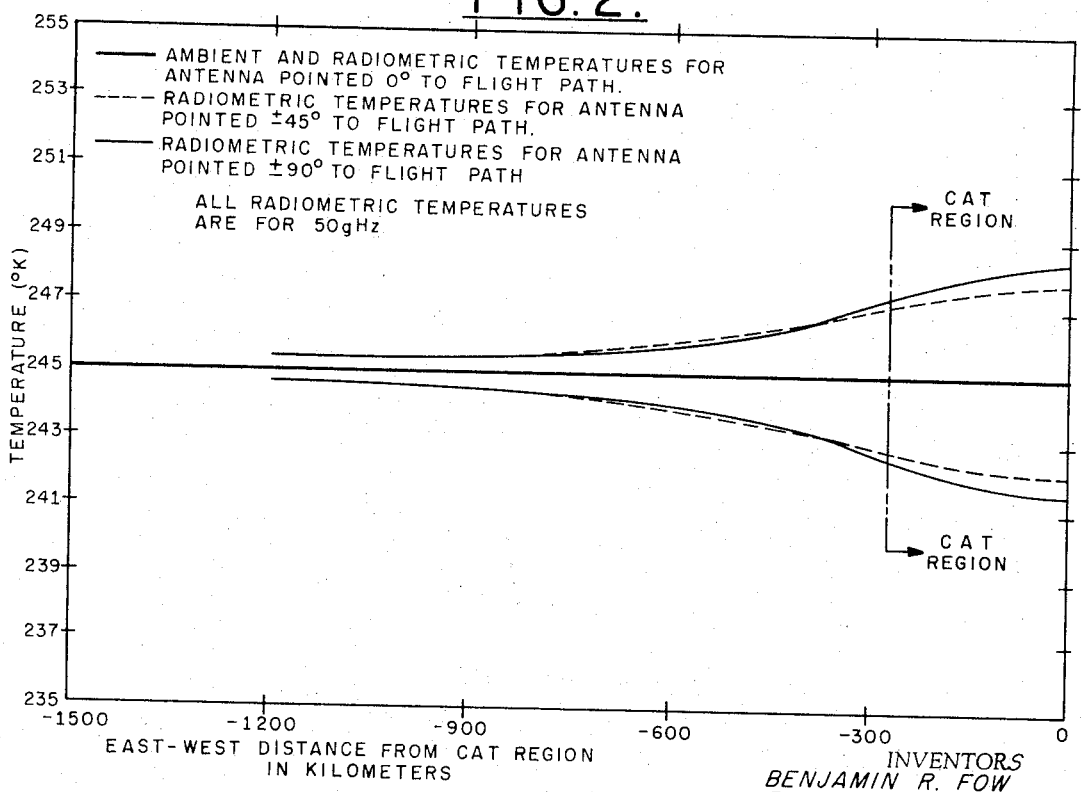
FIGURE 3 is a plot of typical radiometric and ambient temperature measurements made along five different directions relative to an assumed flight path from B' to B in the plot of FIGURE 1.

The outputs from peak detectors 26 and 27 are applied to peak selector 36. The outputs from peak detectors 29 and 30 are applied to peak selector 37. Each of the peak selectors 36 and 37 may comprise a diode OR circuit as shown in Figure 13–3 of "Pulse and Digital Circuits" by Millman and Taub, McGraw-Hill, 1956, p. 394. In the case where the amplitudes of the applied signals are unequal, each peak selector will provide an output signal representing the amplitude of the larger input signal which exceeds a given reference value. The reference value is represented by a predetermined value of back-bias which is applied jointly to the diodes comprising the peak selector so that no diode conducts until one of the inputs exceeds the reference value. Thus, peak selector 36 provides on line 38 an output signal representing the amplitude of the larger of the two signals from peak detectors 26 and 27 which exceeds the predetermined reference value. The reference value, in turn, represents a temperature gradient (difference between radiometer temperature and ambient temperature) above which clear air turbulence is likely to be encountered.

Therefore, a signal on line 38 should indicate a likelihood that CAT is present to the right of the aircraft heading, a signal on output line 39 should warn that CAT is likely to be encountered on the left side of the aircraft heading, and a signal on line 40 at the output of peak detector 28 should represent that CAT is likely to be encountered directly ahead of the aircraft. However, the signals on lines 38, 39 and 40 cannot be interpreted so simply without the possibility that an error arise in special circumstances. For example, if an aircraft is proceeding along the isotherm path B′−B of FIGURE 1, advance warning signals of equal amplitude will appear on lines 38 and 39 but not on line 40. Said combination of signal conditions indicates that CAT lies ahead along the line of flight and should be avoided by a turn to the right or to the left at the pilot's discretion. In another exemplary situation, the aircraft may be heading along the line A′−A of FIGURE 1. In that event, an advance warning signal is produced on line 40 but not on either of lines 38 or 39 unless the aircraft actually continues towards the CAT zone whereupon signals appear on lines 38 and 39 also. This combination of signal conditions also indicates that CAT lies ahead in the direction of flight and should be avoided by a turn to the right or to the left at the pilot's discretion. All directions of flight resulting in the production of an advance warning signal on line 38 but not on lines 39 and 40 indicate CAT to the right which is to be avoided by a turn to the left. On the other hand, an advance warning signal on line 39 but not on lines 38 and 40 indicates CAT to the left which is to be avoided by a turn to the right. The various signal condition combinations are sensed and the appropriate evasive maneuver indication is given with the aid of elements 41 and 43–53 inclusive of FIGURE 4.

The signals, if any, appearing on lines 38 and 39 are applied to subtracting circuit 41 to provide a signal on output line 42 whose polarity represents the side of the aircraft on which the maximum temperature gradient was found. For example, if the maximum temperature gradient is on the right side (represented by a signal on line 38), the polarity of the signal on line 42 is positive. Conversely, if the maximum temperature gradient is on the left side (represented by a signal on line 39), the polarity of the output signal on line 42 is negative. The output signal on line 42 is applied through normally conducting inhibit gate 43 to indicating lamps 44 and 45 via respective diodes 46 and 47. Gate 43 is inhibited against conduction upon the appearance of a signal on line 40 at the output of peak detector 28. In the absence of a signal on line 40 and assuming that the maximum temperature gradient is on the right side of the aircraft, the positive polarity signal on line 42 is directed by gate 43 and diode 46 to lamp 44. The energization of lamp 44 warns the pilot that the CAT is to be avoided by executing a maneuver to the left. Similarly, lamp 45 is energized whenever an evasive maneuver to the right is to be executed in order to avoid CAT lying to the left of the aircraft heading.

As previously discussed, the presence of a signal on line 40 with the concurrent absence of signals on lines 38 and 39 requires that the pilot execute an evasive maneuver either to the left or to the right at his option. The required warning indication to the pilot is produced with the aid of elements 48, 52 and 53. In particular, normally open switch 53 is closed by the signal on line 40 to connect line 54 to ground thereby energizing lamp 48 via battery 52. The energization of lamp 48 indicates that a left or a right CAT avoidance maneuver is to be initiated by the pilot at his discretion. It should be noted that although the signal first appears on line 40 as the aircraft heads toward the CAT zone along line A′—A, signals may also appear on lines 38 and 39 if the aircraft later actually enters the CAT zone. The inhibit gate 43, however, is rendered non-conductive by the signal on line 40 to obviate the possibility that lamp 44 or 45 becomes energized after lamp 48 is energized by the signal on line 40. In the last remaining event that advance warning signals of equal amplitude appear on line 38 and 39 but no signal appears on line 40, normally open switches 49 and 50 are closed, and normally closed switch 51 remains closed thereby connecting line 54 to ground and energizing lamp 48. It should be noted that if the signals on lines 38 and 39 are unequal (calling for a designated left or right turn not at the pilot's discretion), the subtracting circuit 41 produces an output signal on line 55 which opens switch 51 to preclude the energization of lamp 48. Also, in the absence of any signals on line 38, 39 or 40 (no CAT at all), switch 51 remains closed and switches 49, 50 and 53 remain open thereby precluding the energization of lamp 48 and inhibit gate 43 receives no signal thereby precluding the energization of lamps 44 and 45.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for producing an advance warning of clear air turbulence comprising:
    radiometer means producing a first signal representing the temperature of a known volume of air in a known direction relative to the direction in which a protected aircraft is heading,
    means producing a second signal representing the temperature of the air at the location of said aircraft,
    first comparison means receiving said first and second signals and producing a third signal representing the difference therebetween,
    a source of reference signal, and
    second comparison means receiving said third signal and said reference signal and producing a fourth signal in the event said third signal exceeds said reference signal,
    said fourth signal indicating a likelihood of clear air turbulence within said volume of air.

2. Means for producing an advance warning as defined in claim 1 and further including means for receiving said fourth signal and producing an evasive maneuver signal to guide said aircraft away from said clear air turbulence.

3. Means for producing an advance warning as defined in claim 1 and further including:

means for obtaining a plurality of said first signals from said radiometer means, each of said first signals representing the temperature of a known volume of air in a known respective direction relative to the direction in which said aircraft is heading, each of said first signals being compared in said first comparison means with said second signal to produce a plurality of said third signals, each of said third signals representing the difference between said second signal and a respective first signal, and each of said third signals being compared in said second comparison means with said reference signal to produce a fourth signal in the event that one of said third signals exceeds said reference signal, said fourth signal representing the maximum third signal.

4. Means for producing an advance warning as defined in claim 3 and further including:

means receiving said fourth signal and producing an evasive maneuver signal to guide said aircraft away from said clear air turbulence.

5. Means for producing advance warning as defined in claim 1 and further including means for obtaining first and second pluralities of said first signals from said radiometer means, each of said first signals representing the temperature of a known volume of air in a known respective direction relative to the direction in which said aircraft is heading, the directions corresponding to said first plurality of first signals being on one side of the direction in which said aircraft is heading, the directions corresponding to said second plurality of first signals being on the other side of the direction in which said aircraft is heading, each of said first plurality of first signals being compared in said first comparison means with said second signal to produce a first plurality of said third signals, each of said second plurality of first signals being compared in said first comparison means with said second signal to produce a second plurality of said third signals, each of said third signals representing the difference between said second signal and a respective first signal, each of said first plurality of third signals being compared in said second comparison means with said reference signal to produce a fourth signal in the event that one of said first plurality of third signals exceeds said reference signal, said fourth signal representing the maximum of said first plurality of third signals, and a third comparison means receiving said second plurality of third signals and said reference signal and producing a fifth signal in the event that one of said second plurality of third signals exceeds said reference signal, said fifth signal representing the maximum of said second plurality of third signals.

6. Means for producing an advance warning as defined in claim 5 and further including means receiving said fourth and fifth signals and producing an evasive maneuver signal to guide said aircraft away from said clear air turbulence.

7. Means for producing an advance warning of clear air turbulence comprising radiometer means producing a first signal representing the temperature of a known volume of air in a known direction relative to the direction in which a protected aircraft is heading, means producing a second signal representing the temperature of the air at the location of said aircraft, comparison means receiving said first and second signals and producing a third signal representing the difference therebetween, and means receiving said third signal and producing a fourth signal in the event said third signal exceeds a predetermined value representing a likelihood of clear air turbulence within said volume of air.

References Cited

UNITED STATES PATENTS

| | | |
|---|---|---|
| 2,458,654 | 1/1949 | Southworth. |
| 3,028,596 | 4/1962 | McGillem et al. ___ 73—355 X |
| 3,182,499 | 5/1965 | Moses _____ 250—83.3 |
| 3,251,057 | 5/1966 | Buehler et al. _____ 343—5 |

RICHARD A. FARLEY, *Primary Examiner.*

RODNEY D. BENNETT, *Examiner.*

R. E. BERGER, *Assistant Examiner.*